(12) United States Patent  
Vogel

(10) Patent No.: US 8,195,571 B2  
(45) Date of Patent: Jun. 5, 2012

(54) WEB-BASED SYSTEM AND METHOD TO CAPTURE AND DISTRIBUTE ROYALTIES FOR ACCESS TO COPYRIGHTED ACADEMIC TEXTS BY PREVENTING UNAUTHORIZED ACCESS TO DISCUSSION BOARDS ASSOCIATED WITH COPYRIGHTED ACADEMIC TEXTS

(76) Inventor: Joseph Henry Vogel, San Juan, PR (US)

( * ) Notice: Subject to any disclaimer, the term of this patent is extended or adjusted under 35 U.S.C. 154(b) by 1097 days.

(21) Appl. No.: 11/517,080

(22) Filed: Sep. 7, 2006

(65) Prior Publication Data

US 2008/0076105 A1     Mar. 27, 2008

(51) Int. Cl.  
*G09B 3/00* (2006.01)  
*G09B 7/00* (2006.01)  
*G06F 17/30* (2006.01)

(52) U.S. Cl. .......................................... 705/57; 434/322

(58) Field of Classification Search .............. 705/50–51, 705/57  
See application file for complete search history.

(56) References Cited

U.S. PATENT DOCUMENTS

| | | | |
|---|---|---|---|
| 5,629,980 A * | 5/1997 | Stefik et al. | 705/54 |
| 6,385,614 B1 | 5/2002 | Vellandi | |
| 6,633,877 B1 | 10/2003 | Saigh et al. | |
| 6,790,045 B1 * | 9/2004 | Drimmer | 434/336 |
| 2002/0073327 A1 | 6/2002 | Vellandi | |
| 2002/0087496 A1 * | 7/2002 | Stirpe et al. | 706/45 |
| 2002/0144153 A1 | 10/2002 | LeVine | |
| 2002/0182578 A1 | 12/2002 | Rachman | |
| 2004/0103295 A1 | 5/2004 | Gustafsson | |
| 2005/0086172 A1 * | 4/2005 | Stefik | 705/51 |
| 2006/0074913 A1 | 4/2006 | O'Sullivan | |

FOREIGN PATENT DOCUMENTS

WO        WO03/100560        * 12/2003

OTHER PUBLICATIONS

Sosin et al., "Teaching with Technology: May You Live In Interesting Times", Journal of Economic Education, 2005, 32 pages.*

* cited by examiner

*Primary Examiner* — James D Nigh  
(74) *Attorney, Agent, or Firm* — DLA Piper LLP (US)

(57) ABSTRACT

A system and method for preventing unauthorized access to copyrighted academic texts is provided in which trademark licenses, discussion boards, and grade content are integrated into a web-based system that aligns the interests of teaching professionals, students, and publishers while also enhancing the overarching academic mission to create and disseminate knowledge.

4 Claims, 6 Drawing Sheets

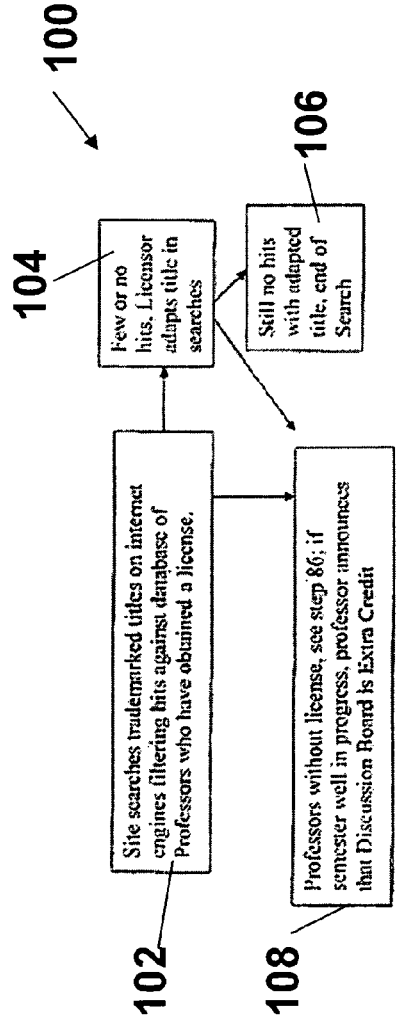
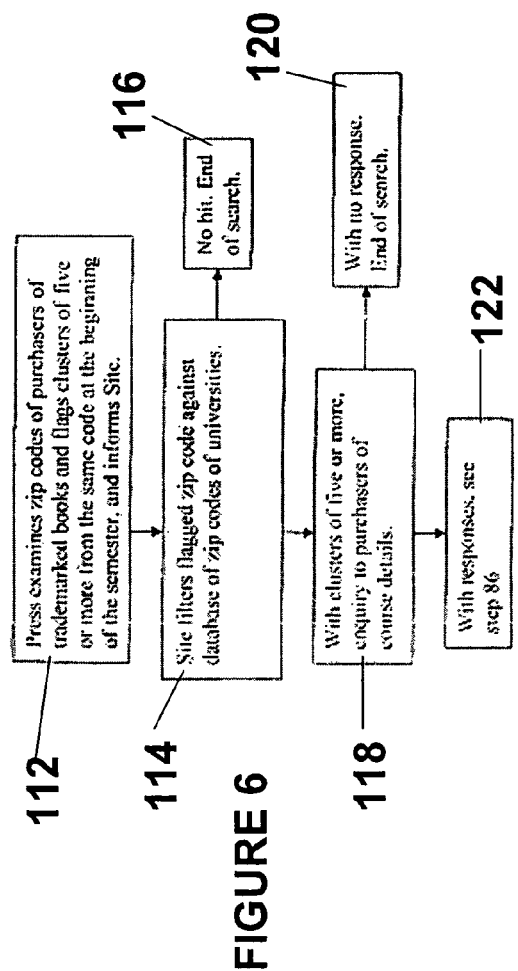
FIGURE 5
FIGURE 6

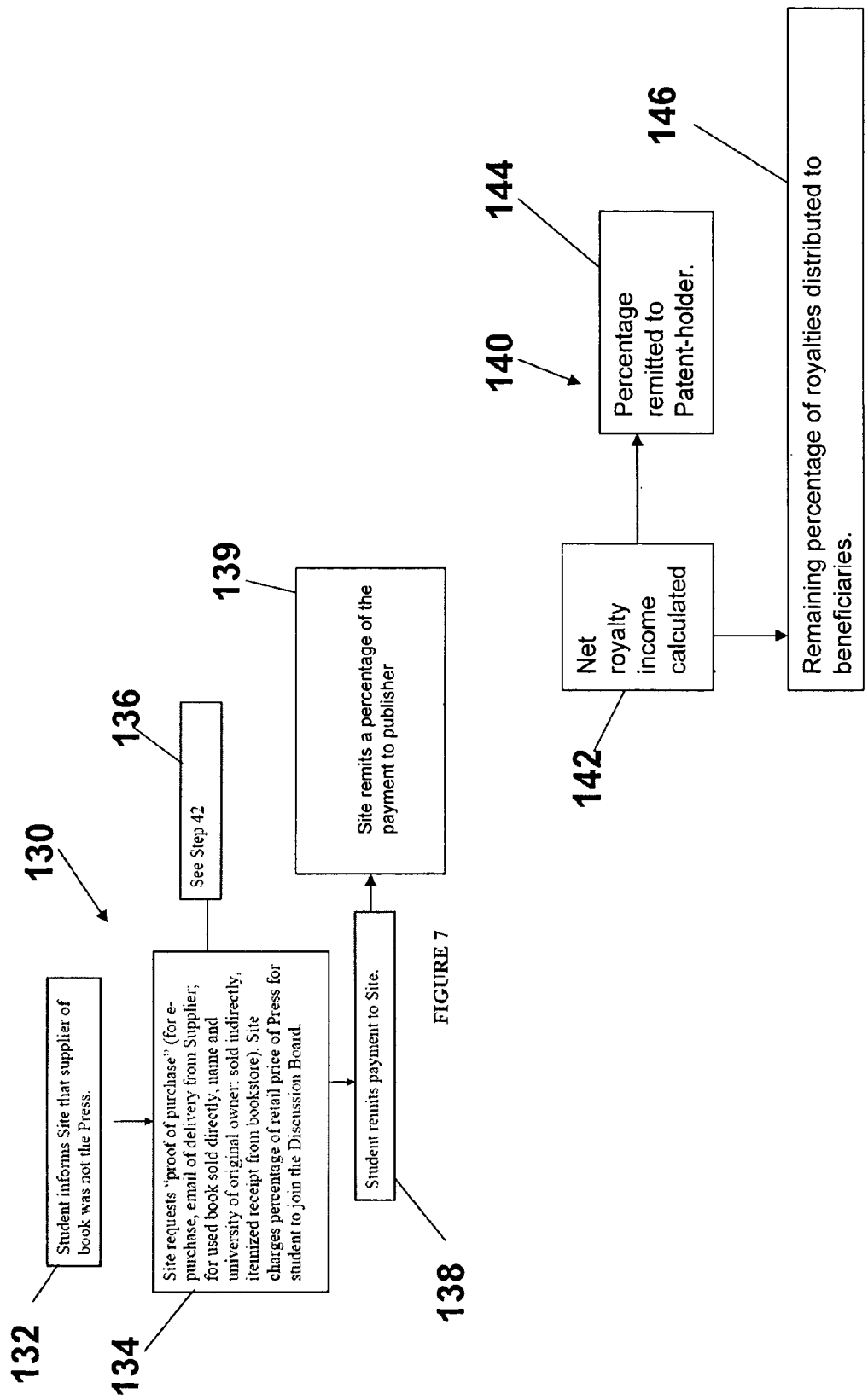

WEB-BASED SYSTEM AND METHOD TO CAPTURE AND DISTRIBUTE ROYALTIES FOR ACCESS TO COPYRIGHTED ACADEMIC TEXTS BY PREVENTING UNAUTHORIZED ACCESS TO DISCUSSION BOARDS ASSOCIATED WITH COPYRIGHTED ACADEMIC TEXTS

FIELD OF THE INVENTION

The invention relates generally to a system and method for controlling use of academic texts.

BACKGROUND OF THE INVENTION

In the modern world and current technology, it is possible to scan a document or a piece of text, such as a textbook. Unfortunately, the incidence of piracy of text or textbooks rises as the costs of scanning declines. This issue was captured in a cover story for *The New York Times Magazine* on May 14, 2006, entitled, "Scan this book!" The author, Kevin Kelly, writes:

"Many methods have been employed to try to stop the indiscriminate spread of copies, including copy-protection schemes, hardware-crippling devices, education programs, even legislation, but all have proved ineffectual. The remedies are rejected by consumers and ignored by pirates. As copies have been dethroned, the economic model built on them is collapsing. In a regime of superabundant free copies, copies lose value. They are no longer the basis of wealth"

Kelly's exposé elicited "The End of Authorship" by the illustrious John Updike in *The New York Times Book Review* (Jun. 25, 2006).

"The economic repercussions of this paradise of freely flowing snippets are touched on with a beguiling off-handedness, as a matter of course, a matter of an inexorable Marxist unfolding. As the current economic model disappears, Kelly writes, the 'basis of wealth' shifts to 'relationships, links, connection and sharing.' Instead of selling copies of their work, writers and artists can make a living selling 'performances, access to the creator, personalization, add-on information, the scarcity of attention (via ads), sponsorship, periodic subscriptions—in short, all the many values that cannot be copied. The cheap copy becomes the 'discovery tool' that markets these other intangible values.' This is, as read, a pretty grisly scenario."

The problem has reached crisis proportions due to technical and cultural reasons. High-speed telecommunications enable quick downloading of pirated texts while inexpensive photocopiers allow home reproduction of legitimately bought hard copies. Professors are increasingly turning a blind eye when students appear in class with photocopied pages. Others facilitate piracy by placing texts in the library reserve where they can be photocopied. A "tragedy of the commons" ensues for the professorate: individual manuscripts whose legitimate circulation would have justified publication are not published which diminishes the prospects of tenure and promotion. Tenure underpins academic freedom which is essential for unfettered enquiry. Therefore, professors as well as authors and publishers need a system and method to combat piracy which becomes more rampant as the technology to scan and make unauthorized copies of pieces of text, such as academic textbooks, becomes more readily available and less expensive.

Various systems and methods exist that attempt to combat the problem of piracy. These systems use copy protecting schemes to control digital content data or to the course support server onto which a user is logged. Some use digital markers, known as cookies, to limit a user's access to reuse/renewal to e-books or provide security measures to prevent copying unless the user is actively logged onto the course support server. Others use a counter that controls encryption/decryption of copies or devices that track the number of copies and encryption. Another type determines accessibility by filtering information relating to users with requests from users. None of the known systems filter information to a user based on the user's registration with a discussion board, the establishment of which is a requirement for a license permitting citation of the trademarked text in a syllabus. Likewise, none attempts to align the incentives of all of the participants of a system, such as authors, publishers, teaching professionals and students, by using software feedback mechanisms of pecuniary and non-pecuniary benefits and costs to the participants.

Thus, it is desirable to provide web-based system and method for preventing unauthorized access to copyrighted academic texts and it is to this end that the present invention is directed.

SUMMARY OF THE INVENTION

A system and method for preventing unauthorized access to copyrighted academic texts is provided. The present invention integrates trademark licenses, discussion boards, and grade content into a web-based system that provides incentives for all interested parties to comply with copyright law while also enhancing the overarching academic mission to create and disseminate knowledge.

BRIEF DESCRIPTION OF THE DRAWINGS

FIG. 5 illustrates a process in which a teacher/professor adopts the book, does not seek a license and no student enters the Site to make an enquiry regarding discussion board;

FIG. 6 illustrates a process in which a teacher/professor adopts book, does not seek a license, no student makes an enquiry, and there is no evidence whatsoever of course on the web;

FIG. 7 illustrates a process in which a student purchases the text from someone other than the Publisher; and FIG. 8 illustrates a process in which remittance of half of royalty income net of operating costs to beneficiaries.

DETAILED DESCRIPTION OF AN EXEMPLARY IMPLEMENTATION OF THE INVENTION

Figure 1:
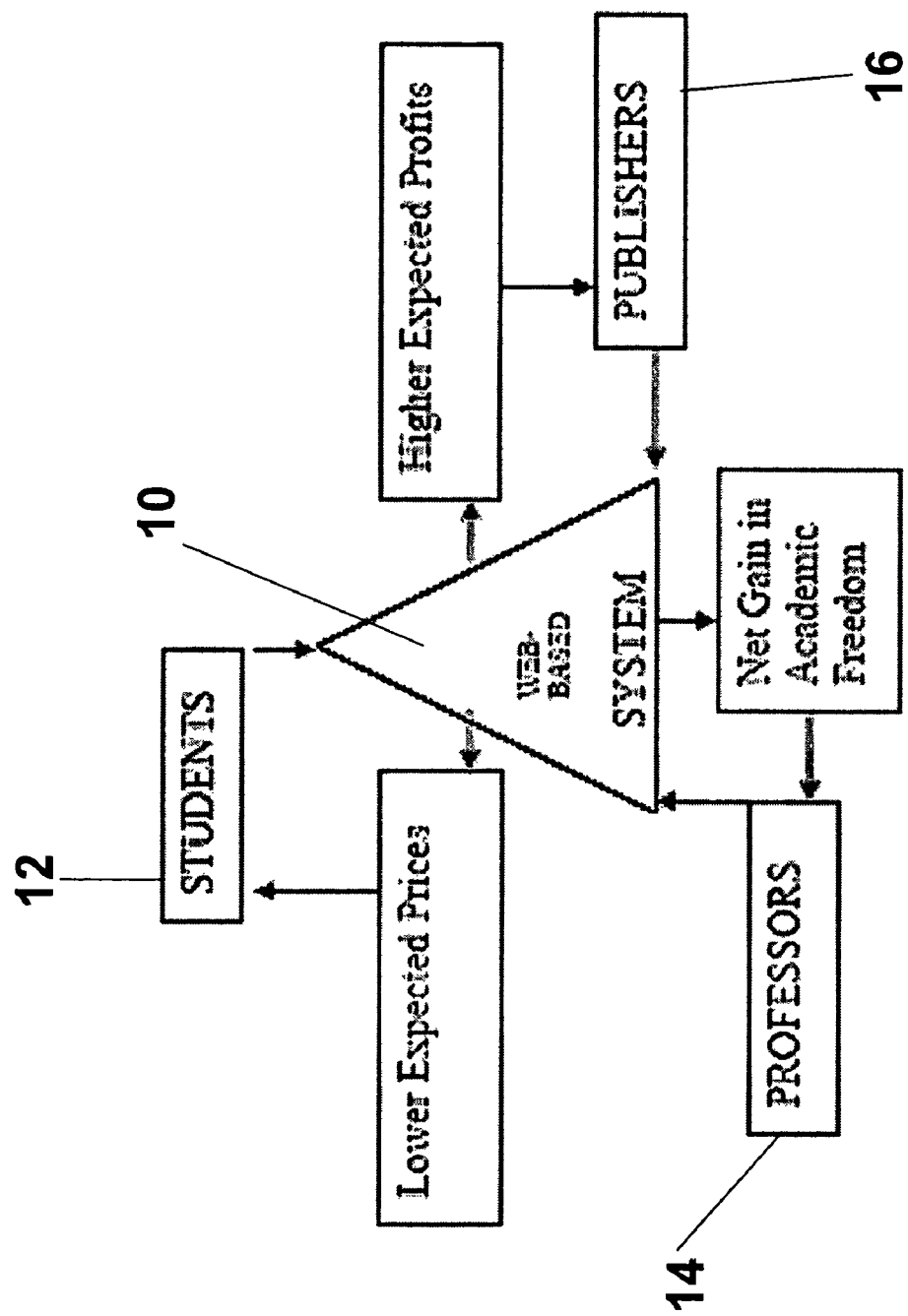
FIG. 1 is a high level diagram of a system for preventing unauthorized copying of academic texts.

The invention is particularly applicable to the illustrated web-based system that performs the steps and functions shown in the diagrams to prevent copying of academic texts and it is in this context that the invention will be described. It will be appreciated, however, that the system and method in accordance with the invention has greater utility since it may be implemented using other hardware, software and other systems and may perform other/additional steps and function without departing from the scope of the invention and the system may be used to prevent the unauthorized copying of other pieces of content which are within the scope of the invention. The academic texts described below in more detail may also be any bundled information that is used in a syllabus for a course.

The system may bring together a plurality of participants in a cooperative manner to achieve the goal of preventing unauthorized copying of academic texts wherein the incentives of each participant is aligned. The participants may include one or more students, one or more teachers/professors, one or more publishers, one or more authors and one or more beneficiaries including any intellectual property holders.

The system interacts with each student. According to a report by the Government Accountability Office, the prices of textbooks have tripled between 1984 and 2004 and the inflation cannot be explained by the greed of academic presses since many barely survive due to a shrinking market which is attributable, in part, to the unauthorized access to academic texts, i.e., piracy. Piracy drastically increases the average fixed cost of a text which is then reflected in the market price. In other words, a shrinking base of purchasers is assuming the burden imposed by pirates. Despite a significant royalty cost (e.g., 10%) of the system herein, its adoption can actually lower the price of textbooks by spreading fixed costs over all of the users. To affect this pecuniary benefit for students who legitimately purchase texts, incentives must be aligned against students who pirate those same texts to encourage the student to legitimately purchase the text. The system implements a process by which any enrolled student who has not purchased the textbook will be denied access to a discussion board of an official site ("Site") of the system controlled by the patent holder. However, the patent holder may license the right to establish the discussion board to the press and require the press to allow the holder full access to the licensed discussion board. Once a discussion board is established on the Site, the teaching professional can implement a syllabus in which a significant portion of the final grade of a student is based on the participation in the discussion board. Thus, a student who does not legally purchase the text will be unable to participate in the discussion board and therefore will forfeit that portion of the grade associated with it. It is likely that most students do not want to forfeit that portion of their grade and therefore will legally purchase the text. This benefit of the system is complemented by a non-pecuniary benefit for the student: the opportunity, through the discussion board, to discuss the text with classmates at their university as well as with classmates from other universities where the same text has also been adopted in a syllabus.

The system interacts with teacher/professors. In one respect, the system diminishes the academic freedom of the teachers/professor by requiring that he or she (1) obtain a license, free of charge, to use a trademarked book in his or her syllabus (2) assign a significant percentage of the final grade as participation in the discussion board managed by the Site and (3) send the syllabus to the Site to verify compliance with the requirement of assigning a significant portion of the final grade as participation in the discussion board. One suspects that the teacher/professor will only accept the diminished academic freedom implied by requirements (1), (2), and (3), because he or she perceives that the system will enhance academic freedom in other key areas of concern, with the gains outweighing the losses. In particular, a percentage of the net royalty income such as, for example, 50% generated from textbooks sold by presses using the system, collected in the US and Canada may be dedicated to litigating tenure disputes from both within and outside the university walls. The job stability afforded by tenure is the wellspring of academic freedom. Toward this end the royalty income may be distributed as follows (assuming that the total allocated income is 50% of the royalty income): 10% for actions challenging post tenure-reviews, 10% for actions challenging tenure decisions, 10% for unionization of non-tenurable professors, 10% for actions challenging grant decisions by private foundations (with these monies being allocated to an organization such as American Association of University Professors) and 10% for dissemination of news regarding academic freedom (with this money being allocated to an organization, such as The Chronicle of Higher Education or similar institutions dedicated to academic freedom and/or development of the faculty community). Such pricing and distribution is indeed novel. Standard economic theory assumes that pricing is amoral and governed by the mechanical maximization of profits; agents set prices where marginal revenue equals marginal cost and fairness in the distribution of income is not germane for the key decision-maker. The system departs radically by assuming that the professor highly values fairness in pricing as well as in the distribution of income and a royalty percentage of, say, 10% will resonate as culturally acceptable and fair. The fairness is reinforced by the 50-50 split of the net royalty income between the owner of the invention and the other beneficiaries whose activities enhance academic freedom through the defense of the institution of tenure and job stability.

The system interacts with publishers (any natural or artificial person that sells bundled information) of the academic texts. By eliminating piracy using the system, the publisher can increase profits by spreading fixed costs over a larger customer pool and lower price by selling a larger quantity of the trademarked text. The system also eliminates the participation of university bookstores which typically markup books by 33%. Similarly, the system addresses the growing practice of professors emailing the email addresses of students of the previously given course to the current students, thereby facilitating a used book market. To access the discussion board, a fee is charged to students in the used book market which compensates both the inventor and the publisher for the royalties associated with a new book, thereby reducing the incentive of the publisher to issue new editions for the sole purpose of frustrating the used book market. Multiple resources are saved. The web-based system also reduces book returns to the publisher as chapters of a textbook can become available electronically during the typical three week drop/add period before shipment of the physical book. The pecuniary benefit for the publisher is complemented by the non-pecuniary benefit which is the fulfillment of the mission to disseminate knowledge where markets are thin. In other words, the prevention of piracy allows academic presses to publish more specialized texts the demand for which could not otherwise meet the threshold of covering fixed costs. Nevertheless, both the rewards and risks are highest for publishers inasmuch as adoption of the new invention risks losing market to professors who resist change and choose a competitor's non-trademarked texts; however, failure to run that risk itself risks the continuous erosion of market through piracy.

The system interacts with the authors of the academic texts. It permits authors to enter the discussion board and observe/participate. In addition to providing an opportunity to improve future editions through such feedback, the system allows the author to tally the total sales of his/her book used in all syllabi and calculate a lower bound of royalties owed (N.B. a lower bound because trademarked books not adopted in a course syllabus can be sold without a license). Similarly, the system permits precise assessment of the royalty stream of the inventor should the inventor license the publisher to manage the Discussion Board. This transparency afforded by the system is also a non-pecuniary benefit as it fortifies goodwill among the parties (publishers, authors, and the inventor).

FIG. 1 is a high level diagram of a system 10 for preventing unauthorized copying of academic texts. In the example set forth, the system is a web-based system 10 that interacts with one or more students 12, one or more teachers/professors 14 and one or more publishers 16. The general interaction between these participants and the system is described above and will be described in more detail below. The students, teachers/professors and publishers may interact with the system using a computing device, such as a personal computer, laptop computer, PDA, wireless device, mobile phone or any other device with a processor, memory and wireless/wired connectivity that is able to connect to and communicate with the web-based system 10. The system 10 may include well known computing resources, such as a web server that generates and serves web pages to the participants and receives responses from the participants, an application server that stores one or more pieces of software that are executed by a processor(s) of the application server in order to perform the functions and operations of the unauthorized copying preventing system. One piece of software being executed by the application server may be a copy preventing module that comprises a plurality of lines of computer code wherein the execution of the lines of computer code cause the system 10 to perform the operations and functions of the unauthorized copying preventing system. The benefits of the system for each of the participants (which was described above in detail) is shown in FIG. 1. The system 10 creates a collaborative effort to prevent unauthorized copying of academic texts by providing incentives to all of the participants. The process for preventing unauthorized copying of academic texts in accordance with the invention will be described in more detail.

Figure 2:
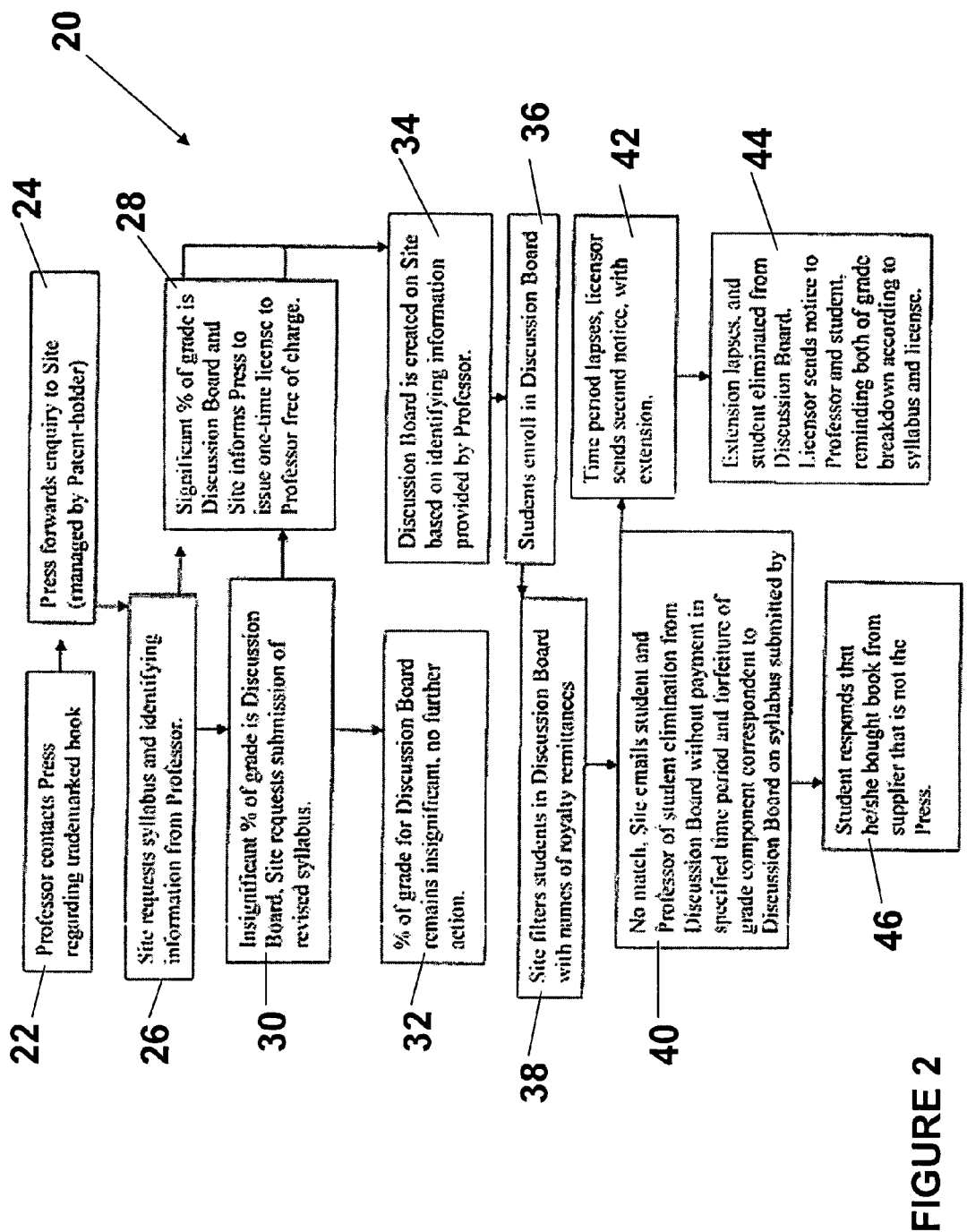
FIG. 2 illustrates an example of a method for preventing unauthorized copying of academic texts.

FIG. 2 illustrates an example of a method 20 for preventing unauthorized copying of academic texts in which one or more steps are performed by the participants and/or the web system computer in order to provide the method for unauthorized copying of academic texts. In step 22, a professor/teacher contacts a publisher (press) about an academic text that the professor/teacher would like to use for his/her class. The academic text is protected by copyright as well as a trademark that protects the title of the academic text. In step 22, the publisher (who is a user of the web-based system) forwards the request onto the copy preventing module of the web-based system. The web-based system may have a website that announces that any adoption in a syllabus of a trademarked title without a license is a trademark infringement. The syllabus is an outline of what is covered in the course and normally distributed in the first class sessions. Each publisher agrees to use the web-based system to prevent unauthorized copying and is issued a license by the system 10 when the publisher submits a list of the trademarked texts that are owned/controlled by the publisher. In step 26, the copy preventing module of the web-based system requests the syllabus and identifying information from the particular teacher/professor. In step 28, if a significant percentage of the grade for the particular course is from participation in a discussion board for the course hosted by the web-based system, the copy preventing module informs the publisher (who is already a client of the web-based system) that the publisher can issue a one-time license to the professor/teacher free of charge or at some nominal amount. If the syllabus reveals that an insignificant percentage of the grade for the course is for participation in the discussion board/group, the copy preventing module requests a revised submission by the professor/teacher in step 30. In step 32, if the percentage remains too insignificant, the professor/teacher is not given the license to adopt the textbook in his or her syllabus.

In step 34, once the license has been issued to the professor/teacher, the discussion board for the particular course is created and hosted by the web-based system using the identifying information provided by the professor/teacher. With the purchase of the academic text by a particular student, the publisher remits a royalty say, 10% (per the agreement with the web-based system) to the web-based system in which the particular student is identified. In step 36, each student of the course enrolls in the discussion board as fulfillment of one of the requirements established in the syllabus. In step 38, the copy preventing module may filter the students that have enrolled in the discussion board with the names of the students who paid for their academic texts. In step 40, if a particular student who is part of the discussion board has not purchased the academic text, the copy preventing module generates a message, such as a email message, to the particular student and professor/teacher informing the student that he/she has a predetermined amount of time, such as a week, in which to purchase the academic text or else forfeit the discussion board portion of the grade for the course. In step 42, if the time period elapses, then the copy preventing module sends a second notice to the particular student and professor/teacher about the forfeiture of the discussion board portion of the grade and provides a predetermined extension period, such as one week. In step 44, when the extension period has expired, the particular student is eliminated from the discussion board and the copy preventing module sends a message to the particular student and professor/teacher about the grade forfeiture by the particular student. In step 46, the particular student responds that he bought the academic text from a supplier that is not the particular publisher so that the method goes to the steps shown in FIG. 7.

Using this method, the unauthorized copying of academic texts by the students and the teacher/professor is reduced or eliminated due to the discussion board participation requirement, the professor/teacher agreement to utilize the web-based system and the publisher's agreement to utilize the web-based system of the unauthorized copying preventing system. As described above, the owner of the web-based system distributes a portion of the royalty income (net of costs of operation), such as 50%, to other beneficiaries whose activities enhance academic freedom through the defense of the institution of tenure and job stability as described above in more detail.

Figure 3:
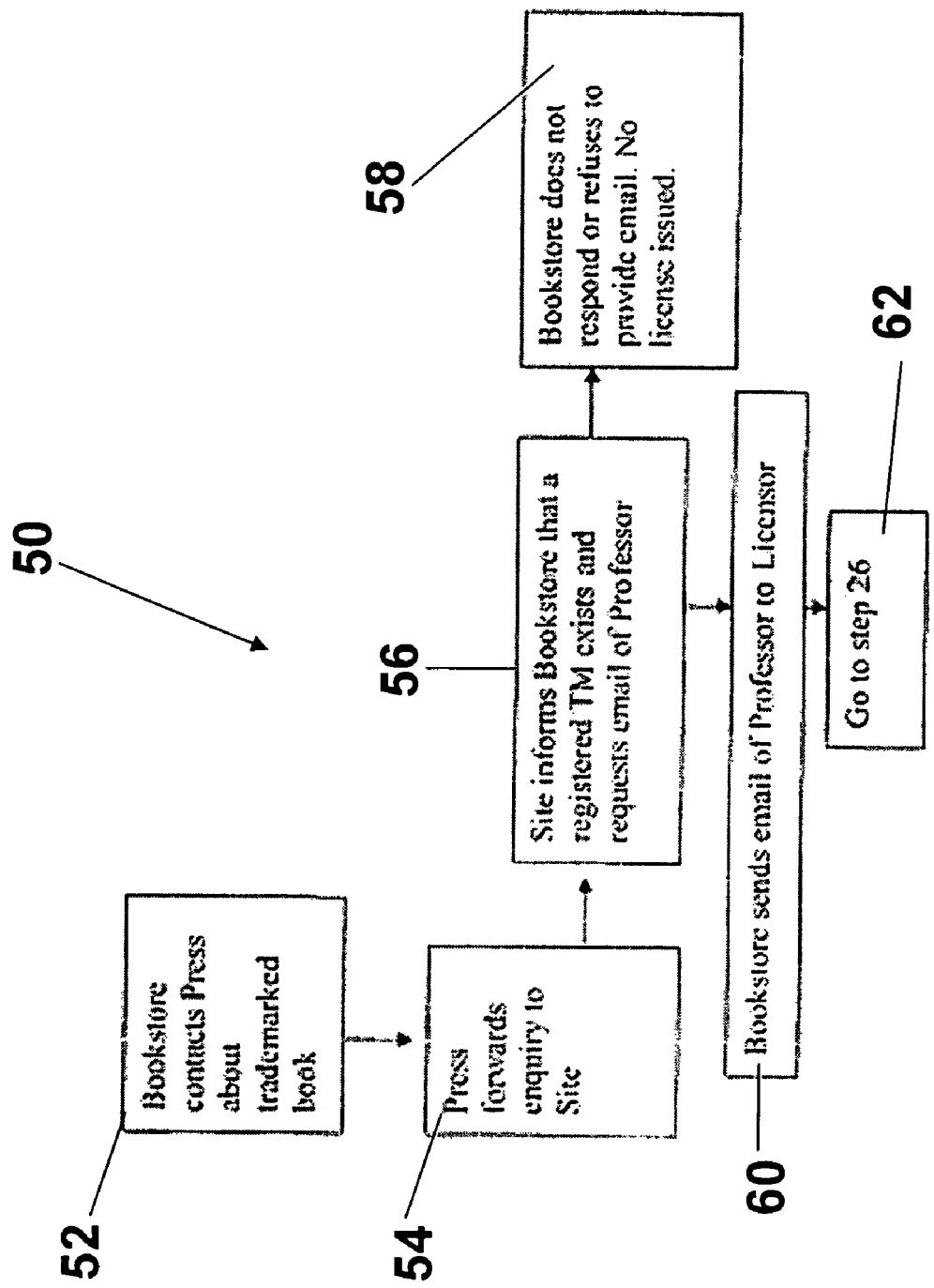
FIG. 3 illustrates a process in which a professor/teacher adopts the book and processes it through the university/local bookstore.

FIG. 3 illustrates more details of a process 50 in which a professor/teacher adopts the book and processes it through the university/local bookstore. In step 52, the bookstore contacts a publisher about a particular trademarked academic text. In step 54, the publisher forwards the inquiry onto the web-based system which, in step 56, informs the bookstore that a registered trademark for the academic text exists and requests contact information for the particular professor/teacher who is requesting the academic text. In step 58, if the bookstore does not provide the contact information for the particular teacher/professor, then no license is issued which means that the bookstore will not be provided copies of the particular academic text. In step 60, the bookstore sends the contact information for the particular teacher/professor and in step 62, the process continues by continuing at step 26 shown in FIG. 2.

Figure 4:
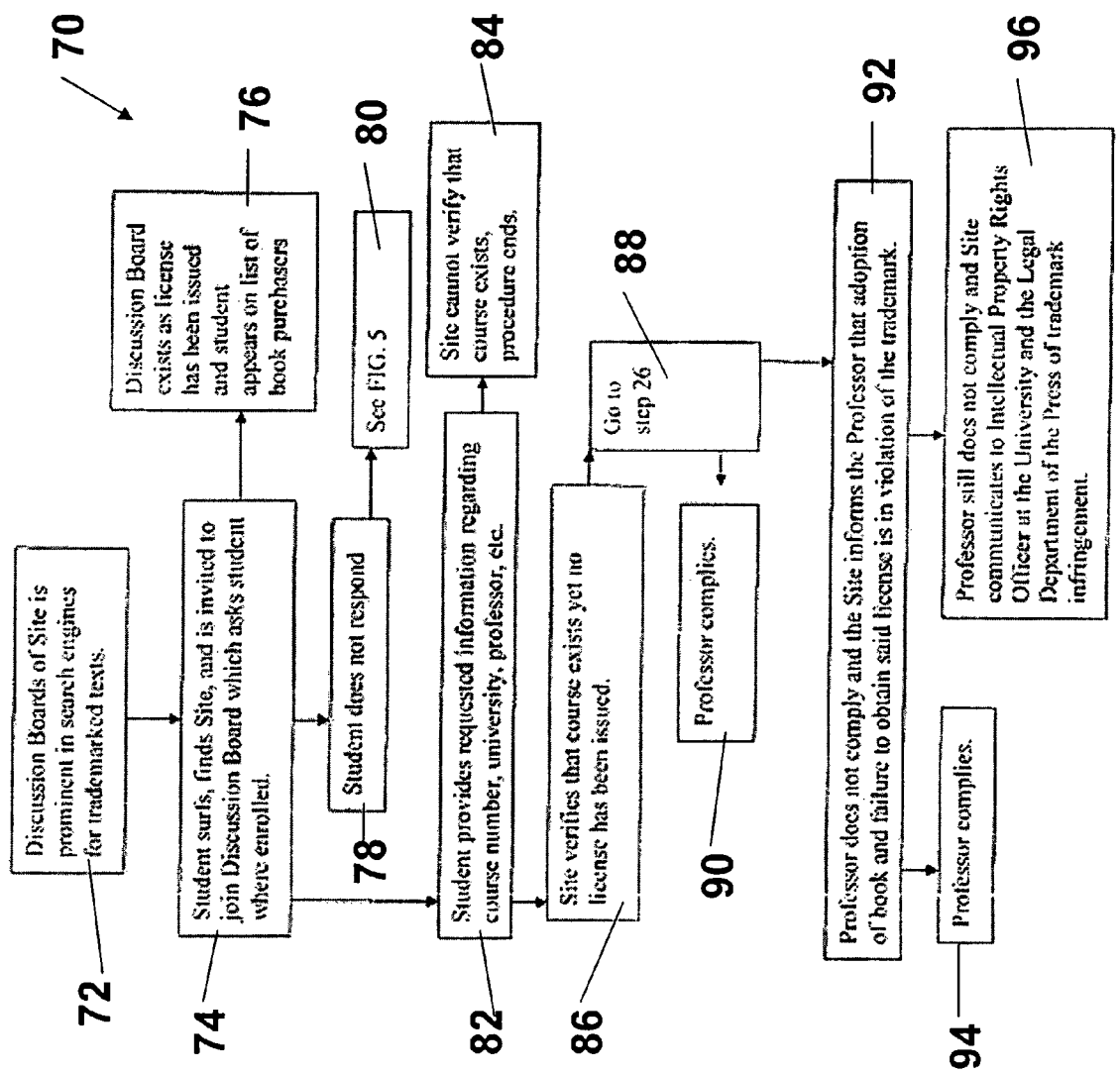
FIG. 4 illustrates a process in which a teacher/professor adopts the book but does not inform bookstore nor acquires license.

FIG. 4 illustrates a process 70 in which a teacher/professor adopts the book but does not inform bookstore nor acquires a license. In step 72, the discussion board of the web-based system are tagged so that they are prominent in search engine results when conducting a search for the trademarked academic texts that are maintained and controlled by the web-based system 10. In step 74, a student may browse and find the web-based system and is invited to join the discussion board for the textbook during which the student is asked to identify the course in which the student is enrolled and the name of the professor who is teaching the course. In step 76, a discussion board for the particular course by the particular professor already exists in the web-based system and the student is identified as someone who purchased the academic text so that the student is permitted to the use the discussion board. In step 78, if the student does not respond, then, in step 80, the method proceeds to the steps in FIG. 5. In step 82, the student provides the requested information about the course, university and the teacher/professor teaching the course. In step 84, if the web-based system cannot verify the course, the method is terminated. In step 86, the web-based system verifies that the course exists, but a license to use the academic text for that course has not been issued. The method then proceeds to step 26 (shown in FIG. 2). In step 90, the teacher/professor complies with the requirements of the web-based system and then the other steps in FIG. 2 are completed. In step 92, the teacher/professor does not comply with the web-based system requirements and the web-based system informs the teacher/professor that adoption of the particular academic text in a syllabus without the license is trademark infringement. In step 94, the professor/teacher may then agree to the web-based system requirements. In step 96, if the teacher/professor still does not agree to comply with the requirements of the web-based system, the web-based system generates a message to the relevant parties, such as an intellectual property rights officer of the university at which the teacher/professor is employed and the legal department of the publisher, indicating that the teacher/professor's adoption of the academic text in a syllabus is trademark infringement.

FIG. 5 illustrates a process 100 in which a teacher/professor adopts the book, does not seek a license and no student enters the Site to make an enquiry regarding discussion board. In step 102, the web-based system searches for the trademarked titles on the internet and then filters the hits against database in the web-based system of teachers/professors who have obtained licenses for the particular academic text. In step 104, if there are no or few hits, the web-based system adjusts the search criteria and in step 106, if there are still no hits for the adapted title search, the process is completed. If a hit is found (either with the original search or the adapted search), of a teacher/professor without a license, then in step 108, the method proceeds to step 86 described above. If the course is already in progress, but the teacher/professor agrees to comply with the license requirements of the web-based system, the teacher/professor may announce that participation in the discussion board of the web-based system results in extra credit in step 108.

FIG. 6 illustrates a process 110 in which a teacher/professor adopts book, does not seek a license, no student makes an enquiry, and there is no evidence whatsoever of the course on the web. In step 112, the publisher (or the web-based system if the appropriate information is provided to the web-based system) examines the zip codes of purchasers of the trademarked books and flags clusters of five or more purchasers from the same code at the beginning of the semester and provides this information to the web-based system. In step 114, the web-based system filters the flagged zip code with a database of zip codes of universities and the search ends in step 116 if there are no hits in the database. In step 118, with clusters of five or more purchasers and a university of the same zip code, the web-based system sends an inquiry to the purchasers about the details of the course for which the academic text is being used. If there is no response, the search is ended in step 120. If a response is received, then the method proceeds to step 86 described above.

FIG. 7 illustrates a process 130 in which a student purchases the text from someone other than the publisher. In step 132, the student informs the web-based system of the contact details of the supplier who is not a publisher that is a user of the web-based system. In step 134, the web-based system requests a "proof of purchase" for the academic text. The proof of purchase for an electronic purchase may be an email message showing the delivery from the supplier for used books sold directly, name and university of original owner; for used books sold indirectly or new books from a non-university bookstore, the itemized receipts from the bookstore. The web-based system may charge a percentage of the retail price, such as 30%, of the publisher for the student to join the discussion board. If the student does not submit the proof of purchase, then in step 136, the method proceeds to step 42. In step 138, the student remits the payment to the web-based system and is given access to the discussion board. In step 139, the site operator remits a percentage of that payment to the publisher.

FIG. 8 illustrates a process 140 in which remittance of half of royalty income net of operating costs to beneficiaries. In step 142, quarterly net royalty income at a predetermined time interval, such as quarterly, is calculated. In step 144, the web-based system then remits some portion of the net income from the royalties collected, such as 50%, to the beneficiaries as described in more detail above. In step 146, the portion of the royalties is distributed to the beneficiaries. Those beneficiaries and their distributions may include, for example, 40% to the American Association of University Professors or similar organization, with 10% for each of litigating regarding post-tenure, tenure, unionization and discriminatory practices by private foundations in grant applications. The remaining 10% may be earmarked for financing efforts to increase circulation of The Chronicle of Higher Education or similar medium of communications.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:
1. An unauthorized copying-prevention system for texts, the system comprising:
 a web-based system;
 a copy-prevention module in the web-based system, the module having a plurality of lines of computer code that implements a copy preventing method;
 a discussion board for a particular course that uses a particular academic text by a particular teaching professional wherein the academic text including a trademark;
 a module having a plurality of lines of computer code that require the particular teaching professional to incorporate the discussion board into a syllabus of the particular course in order to adopt the particular text in the syllabus and a module having a plurality of lines of computer code that requires a student to participate in the discus- sion board for the particular course in order to receive a predetermined percentage of the final grade for the particular course;

a module having a plurality of lines of computer code that requires the student to one of purchase a new copy of the academic text and remit a separate payment when establishing acquisition of the academic text that is not a new copy in order to gain access to the discussion board and not forfeit the predetermined percentage of the final grade as established in the licensee's syllabus; and a module having a plurality of lines of computer code that distributes a portion of the net income from a percentage of student purchases to beneficiaries who enhance the academic freedom otherwise lost by adoption of the system.

2. An unauthorized copying-prevention computer-implemented method for texts, the method comprising:

providing a web-based system that includes a copy-preventing module that controls the unauthorized copying of academic texts, wherein the web-based system is used by a student who is enrolled in a particular course that uses a particular academic text, a professor that teaches the particular course with the particular academic text and a publisher that publishes the particular academic text;

providing a discussion board for a particular course that uses a particular academic text by a particular teaching professional wherein the academic text including a trademark;

requiring the particular teaching professional to incorporate the discussion board into a syllabus of the particular course in order to adopt the particular text in the syllabus and requiring a student to participate in the discussion board for the particular course in order to receive a predetermined percentage of the final grade for the particular course;

requiring the student to one of purchase a new copy of the academic text and remit a separate payment when establishing acquisition of the academic text that is not a new copy in order to gain access to the discussion board and not forfeit the predetermined percentage of the final grade as established in the licensee's syllabus; and distributing a portion of a percentage of the student purchases to beneficiaries who enhance the academic freedom otherwise lost by adoption of the system.

3. An unauthorized copying-prevention computer-implemented method for texts, the method comprising:

providing, on a web-based system, a discussion board for a particular course that uses a particular academic text by a particular teaching professional, the academic text including a trademark;

requiring the particular teaching professional to incorporate the discussion board into a syllabus of the particular course in order to adopt the particular text in the syllabus;

requiring a student to participate in the discussion board for the particular course in order to receive a predetermined percentage of the final grade for the particular course;

requiring the student to purchase a new copy of the academic text or remit a separate payment when establishing acquisition of the academic text that is not a new copy in order to gain access to the discussion board and not forfeit the predetermined percentage of the final grade as established in the licensee's syllabus; and distributing a percentage of the student purchases to beneficiaries who enhance the academic freedom otherwise lost by adoption of the system.

4. An unauthorized copying-prevention computer-implemented system for texts, the system comprising:

a web-based system comprising a server device; and a memory comprising computer executable instructions which when executed by the server device cause the server device to perform the steps of:

performing a computer-based search for a citation to a trademarked academic text in a plurality of course syllabi; and requesting, for each citation of the trademarked academic text in each syllabus, that a teaching professional associated with the course syllabus agree to a license to use the trademarked academic text in the course syllabus.

* * * * *